(12) United States Patent
Serra et al.

(10) Patent No.: US 10,941,800 B2
(45) Date of Patent: Mar. 9, 2021

(54) FASTENING SYSTEM AND AIR HANDLING UNIT COMPRISING SUCH A FASTENING SYSTEM

(71) Applicants: Carrier Corporation, Palm Beach Gardens, FL (US); Marc Serra, Andert et Condon (FR)

(72) Inventors: Marc Serra, Andert et Condon (FR); Samuel Duchet, Lyons (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 253 days.

(21) Appl. No.: 16/080,615

(22) PCT Filed: Mar. 3, 2016

(86) PCT No.: PCT/IB2016/000354
§ 371 (c)(1),
(2) Date: Aug. 28, 2018

(87) PCT Pub. No.: WO2017/149338
PCT Pub. Date: Sep. 8, 2017

(65) Prior Publication Data
US 2019/0024692 A1 Jan. 24, 2019

(51) Int. Cl.
*F16B 19/10* (2006.01)
*F24F 13/20* (2006.01)
(Continued)

(52) U.S. Cl.
CPC .......... *F16B 19/1081* (2013.01); *F16B 37/14* (2013.01); *F24F 13/20* (2013.01); *F16B 5/02* (2013.01)

(58) Field of Classification Search
CPC ........ F16B 19/1081; F16B 37/17; F16B 5/02; F16B 2013/10; F16B 13/04; F16B 5/04;
(Continued)

(56) References Cited

U.S. PATENT DOCUMENTS 2,424,757 A 7/1947 Klumpp, Jr.
2,797,607 A 7/1957 Blaski
(Continued)

FOREIGN PATENT DOCUMENTS

CN 1100184 A 3/1995
CN 1526962 A 9/2004
(Continued)

OTHER PUBLICATIONS

Chinese Office Action and Search Report for application 2016800829267, dated Feb. 3, 2020, 8 pages.
(Continued)

*Primary Examiner* — Jack W Lavinder
(74) *Attorney, Agent, or Firm* — Cantor Colburn LLP (57) ABSTRACT

This fastening system (89), comprises a bushing (27), comprising a main body (33), having an essentially cylindrical shape which defines a main axis (X27) of said bushing, an external collar (39), provided at a proximal axial end (37) of the main body (33), a bore (49), provided through the external collar and the main body, along the main axis, and at least one clamping wing (53), which is provided within a lateral aperture (55) of the main body and is elastically orientable between an outward orientation and an inward orientation relative to the main body, the fastening system comprising a plug (29), which is shaped to be inserted, at least partially, into the bore along the main axis through the external collar, wherein the plug (29) is shaped to force the clamping wing (53) into the outward orientation when said plug is inserted in the bore (49).

14 Claims, 4 Drawing Sheets

(51) Int. Cl.
*F16B 37/14* (2006.01)
*F16B 5/02* (2006.01)

(58) Field of Classification Search
CPC ........ F16B 21/07; F16B 21/073; F16B 21/10;
F16B 5/065; F16B 5/0258; F16B 43/001;
F16B 19/10; F16B 19/04; F24F 13/20;
F24F 13/28; B60R 16/0222; F16L 5/10;
Y10T 29/4995
USPC .............. 411/21, 22, 23, 24, 33, 44; 52/161;
16/2.1, 2.3, 2.4; 24/292, 453
See application file for complete search history.

(56) References Cited

U.S. PATENT DOCUMENTS

| | | | |
|---|---|---|---|
| 3,243,759 A | 3/1966 | Miller | |
| 3,651,734 A | 3/1972 | McSherry | |
| 4,474,517 A | 10/1984 | Navoczynski | |
| 4,481,747 A | 11/1984 | Tengesdal et al. | |
| 5,280,138 A * | 1/1994 | Preston | B65H 57/10 16/2.1 |
| 5,352,077 A | 10/1994 | Lind | |
| 5,599,148 A | 2/1997 | Hirose | |
| 5,629,823 A | 5/1997 | Mizuta | |
| 5,704,752 A * | 1/1998 | Logerot | F16B 19/1081 411/503 |
| 5,846,040 A | 12/1998 | Ueno | |
| 5,954,466 A | 9/1999 | Coffey et al. | |
| 6,364,586 B1 | 4/2002 | Okada | |
| 6,514,023 B2 | 2/2003 | Moerke | |
| 6,626,017 B2 | 9/2003 | Herbeck et al. | |
| 6,691,380 B2 | 2/2004 | Vassiliou | |
| 6,874,983 B2 | 4/2005 | Moerke et al. | |
| 7,188,392 B2 | 3/2007 | Giugliano et al. | |
| 7,908,717 B2 | 3/2011 | Alhof et al. | |
| 8,591,160 B2 | 11/2013 | Shinozaki | |
| 8,636,454 B2 | 1/2014 | Okada et al. | |
| 2002/0094727 A1* | 7/2002 | Auld | A61B 18/22 439/638 |
| 2004/0063398 A1 | 4/2004 | Beser et al. | |
| 2005/0121560 A1 | 6/2005 | Slyter | |
| 2007/0256363 A1 | 11/2007 | Hord et al. | |
| 2007/0289107 A1 | 12/2007 | Alhof et al. | |
| 2008/0031701 A1 | 2/2008 | Boubtane et al. | |
| 2008/0193250 A1 | 8/2008 | Boubtane | |
| 2009/0130878 A1 | 5/2009 | Xu et al. | |
| 2011/0239418 A1 | 10/2011 | Huang | |
| 2014/0056663 A1* | 2/2014 | Fukumoto | F16B 19/002 411/22 |

FOREIGN PATENT DOCUMENTS

| | | |
|---|---|---|
| CN | 202500865 U | 10/2012 |
| CN | 203396061 U | 1/2014 |
| CN | 103976628 A | 8/2014 |
| EP | 1138959 A1 | 10/2001 |
| EP | 1150024 A1 | 10/2001 |
| GB | 1317752 A | 5/1973 |
| GB | 2085516 A | 4/1982 |
| JP | H0828529 A | 2/1996 |
| JP | 2005127390 A | 5/2005 |
| KR | 20130000188 A | 1/2013 |
| WO | 2014121577 A1 | 8/2014 |

OTHER PUBLICATIONS

European Search Report for application EP 16713577.1, dated Apr. 17, 2020, 8 pages.
International Search Report and Written Opinion for application PCT/IB2016/000354, dated Nov. 8, 2016, 9 pages.

* cited by examiner

FASTENING SYSTEM AND AIR HANDLING UNIT COMPRISING SUCH A FASTENING SYSTEM

The present invention concerns a fastening system and an air handling unit comprising such a fastening system.

It is known to implement air handling units on buildings, especially office buildings or supermarkets, for treating the air contained inside the building. Such air handling units usually have inlet and outlet openings, for the air to be circulated through the unit, and a plurality of components, each relative to a function for treating the air, such as circulating, filtering, depolluting, humidifying, drying, heating, cooling, or the like. These components are enclosed inside a structural frame, supporting a housing made of flat insulating panels, forming a protective thermal barrier of the air handling unit. Each panel comprises an insulating core material, for example a glass-wool layer, interposed between two metallic walls. At least some of the panels of the unit are removable, or provided with handles, hinges or the like, so that they may be removed or opened for maintenance of the internal components contained within the unit. Usually, the panels are secured to the frame and/or to each other by means of fasteners such as screws, rivets or the like.

US-A1-2004/0063398 discloses an air handling unit having insulating panels that are secured to each other by means of self-drilling screws that are each inserted in a respective plastic bushing. Each plastic bushing is fixed to an outer skin of the panel by means of two lateral elastic nails of the bushing, which are configured to elastically extend radially. The bushing is further provided with a removable lid to protect the screw from corrosion and provide aesthetic external view.

However, in some cases, connection between the panel and the known removable lid and bushing are not sufficient to reliably avoid vibration-related noise and to ensure that said lid cannot be removed too easily and uncover the screw head.

The aim of the invention is to provide a new fastening system which is configured to be reliably, tightly and strongly secured to a panel of an air handling unit.

To this end, the invention concerns a fastening system, comprising:
  a bushing, comprising:
    a main body, having an essentially cylindrical shape which defines a main axis of said bushing,
    an external collar, provided at a proximal axial end of the main body,
    a bore, provided through the external collar and the main body, along the main axis, and
    at least one clamping wing, which is provided within a lateral aperture of the main body and is elastically orientable between an outward orientation and an inward orientation relative to the main body,
  a plug, which is shaped to be inserted, at least partially, into the bore along the main axis through the external collar,
wherein the plug is shaped to force the clamping wing into the outward orientation when said plug is inserted in the bore.

Thanks to the invention, the plug is retained within the bore by the clamping wing and is thus strongly secured to the bushing. In addition, with the clamping wing being forced and retained in the outward orientation, the plug contributes to ensure a tight connection between a panel and the bushing when said bushing is inserted within a through hole of said panel.

Further optional and advantageous aspects of the invention are defined below:

The clamping wing is configured to elastically pull back from the outward orientation to an intermediate orientation, the intermediate orientation being defined between the outward orientation and the inward orientation, the plug being shaped to force the clamping wing from the intermediate orientation into the outward orientation when said plug is inserted into the bore.
  The plug comprises a plug-in body of substantially cylindrical shape, having a length exceeding an axial distance, measured parallel to the main axis, between the clamping wing and the external collar.
  The clamping wing is connected to the main body at a distal edge of the lateral aperture opposed to the external collar and wherein the clamping wing is elastically orientable around a deformation axis perpendicular to a radius of the main axis.
  The clamping wing is integral with the main body.
  Two clamping wings are provided within diametrically opposed lateral apertures of the main body relative to the main axis.
  The external collar comprises a substantially rectangular main portion extending along a proximal plane which is orthogonal to the main axis.
  The bushing comprises a turned out ridge extending from an edge of the external collar in a direction parallel to the main axis alongside the main body and at a radial distance from said main body relative to the main axis.
  The plug comprises a cap and wherein a counterbore is provided onto the proximal axial end, the cap and the counterbore having a corresponding shape so that said cap is at least partially inserted in said counterbore when the plug is inserted in the bore.
  The bushing comprises foolproof marking provided on the external collar.
  The bushing comprises at least one reinforcing rib protruding outwardly from the main body parallel to the main axis.
  The bushing comprises an internal collar, provided within the bore, at a distal axial end of the main body opposed to the proximal axial end, at a distance from the plug when said plug is inserted in the bore.
  The bushing and the plug are made of a plastic material.

The invention further relates to: an air handling unit comprising at least one insulating panel and at least one fastening system as defined above. Furthermore, optionally and advantageously, the insulating panel comprises at least one structural beam provided with at least one retaining hole and at least one wall provided with at least one through hole, the main body of the bushing being inserted within the retaining hole through the through hole, the clamping wing being put in the outward orientation by the plug.

The invention will now be explained with reference to the annexed drawings, as an illustrative example. In the annexed drawings.

Figure 1:
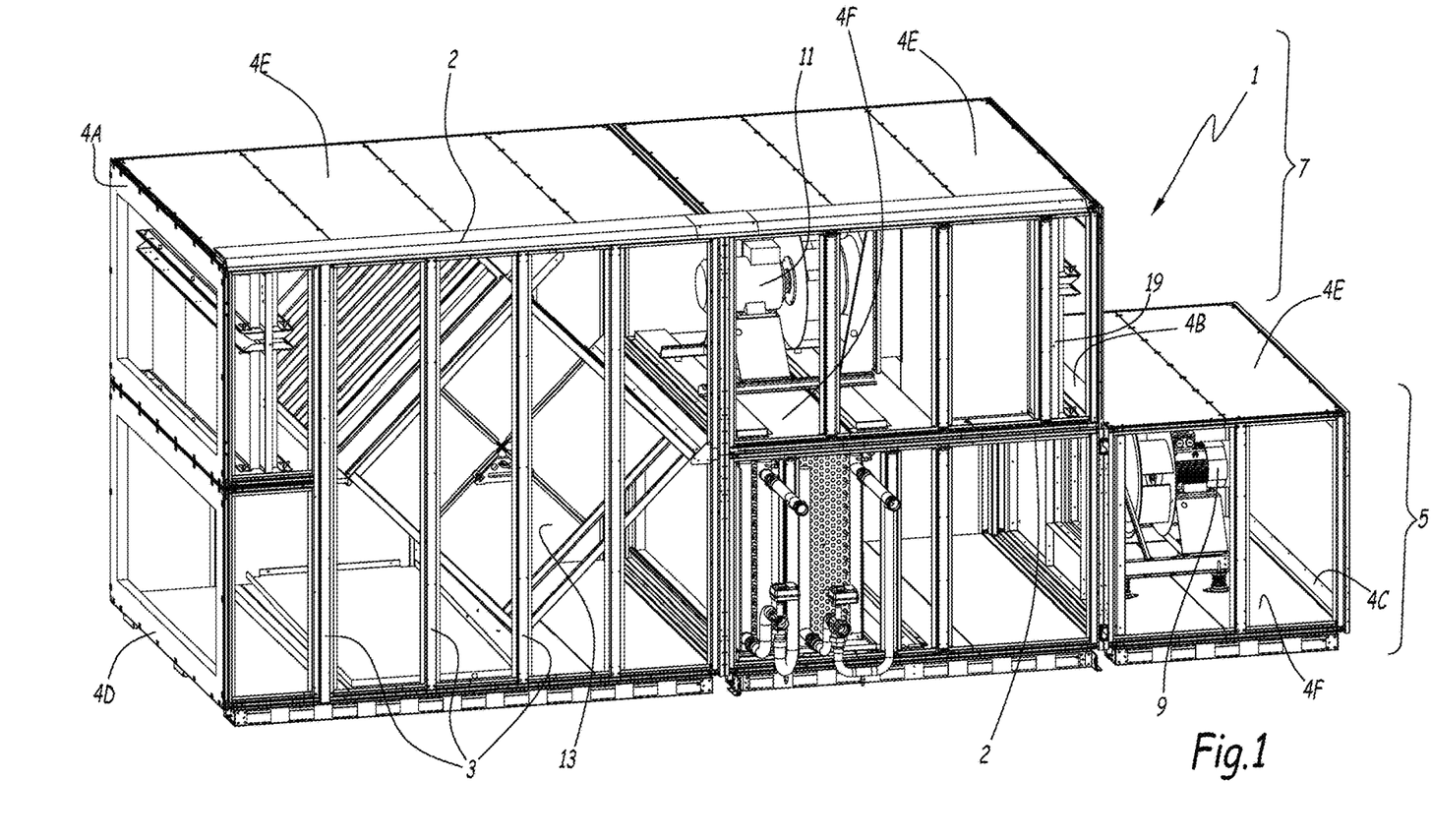
FIG. 1 is a perspective view of an air handling unit according to the invention.

FIG. 1 shows an air handling unit 1 which comprises structural frame including horizontal beams 2 and vertical beams 3. These beams 2 and 3 belong to a housing made of flat insulating panels 4A, 4B, 4C, 4D, 4E and 4F, of substantially rectangular shape. Some of these panels are omitted from FIG. 1 for making the inside of the housing visible. Some other panels 4A and 4B constitute inlet panels 4A and 4B. Some further panels constitute outlet panels 4C and 4D. More panels constitute horizontal roof panels 4E and horizontal floor panels 4F.

The air handling unit 1 comprises two levels, namely a first level 5 and a second level 7 superposed over said first level 5. Level 7 is delimited at its ends by panels 4A and 4B, laterally by successive panels not shown on FIG. 1, at the top by roof panels 4E and at the bottom by floor panels 4F. Similarly, level 7 is delimited at its ends by panel 4C and 4D, the panel 4D being positioned in the same plane as panel 4A, while panel 4C is positioned in a plane parallel to the plane of panel 4B, at a distance of panel 4C. The distance between panels 4B and 4C covered by two roof panels 4E covering the top of level 5 between panel 4B and panel 4C. Successive lateral panels, not shown on FIG. 1, cover level 5 laterally, while the bottom of level 5 is delimited by floor panels 4F.

The air handling unit 1 includes several components, some of which are illustrated in FIG. 1. Among these components, this air handling unit 1 comprises a fan motor assembly 9 enclosed inside the housing at level 5, at the vicinity of panel 4C. The air handling unit 1 comprises a further fan motor assembly 11, enclosed at level 7 between panels 4A and 4B. The air handling unit 1 also has an air heat exchanger 13 provided across levels 5 and 7, between panel 4A and the fan motor assembly 14, and between panel 4D and the fan motor assembly 9. Depending on the application, various other components may be provided to the air handling unit 1 in a manner known per se.

Figure 2:
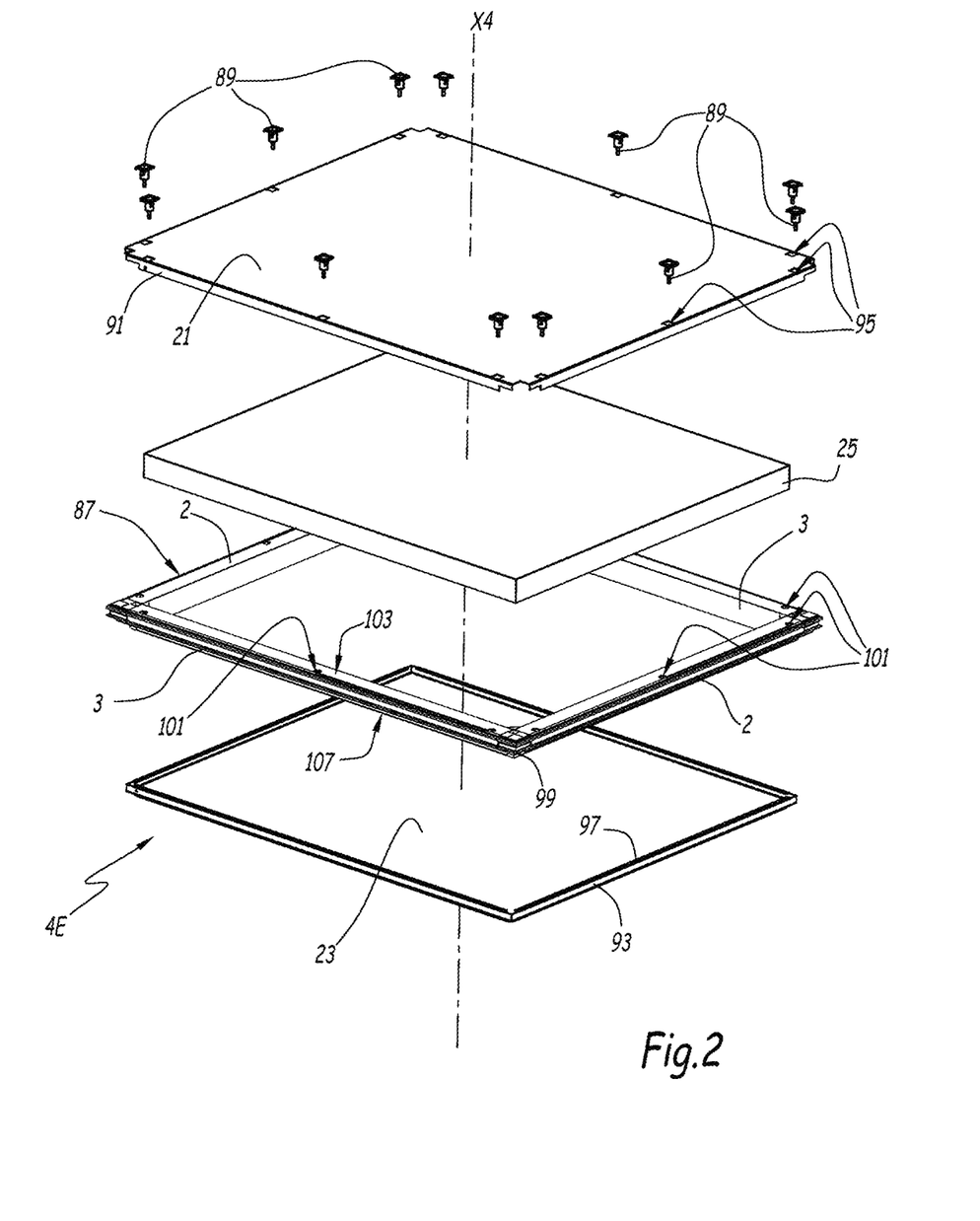
FIG. 2 is a perspective exploded view of an insulating panel of the air handling unit of FIG. 1, including fastening systems according to the invention.

As it is illustrated on FIG. 2, each panel 4A to 4F defines a principal axis X4 perpendicular to its surface. In addition, each panel 4E comprises a first outer wall 21, a second inner wall 23, a layer of insulating material 25, a peripheral frame 87 and a plurality of fastening systems 89. The walls 21 and 23 as well the layer 25 are parallel to each other and perpendicular to the axis X4. The wall 21 is called "outer wall" because it is positioned on the outside of the air handling unit 1. The wall 23 is called "inner wall" because it is positioned on the inside of the air handling unit.

The wall 21 is provided with four edge flanges 91 oriented parallel to the axis X4 towards the wall 23. The wall 23 comprises four edge flanges 93 oriented parallel to the axis X4 towards wall 21. Alternatively, only one among the walls 21 and 23 is provided with edge flanges.

The edge flanges 93 each comprise a flange end 97, which is oriented perpendicular to the principal axis X4 towards the center of the wall 23. Furthermore, the outer wall 21 comprises a plurality of through holes 95, positioned along its periphery. More precisely, three through holes 95 are provided on each edge of the outer wall 25. The through holes 95 are configured to receive, when the panel 4A to 4F is assembled, the fastening systems 89.

The walls 21 and 23 are made of a substantially rigid material, such as aluminum alloy or any other metallic material, or alternatively a plastic material.

The layer 25 is arranged between the walls 21 and 23 and secured to at least one of them, for example with adhesive band. The insulating layer 25 contributes limiting heat transfer through the panel 4A to 4F. Thus, the assembled panels 4A to 4F form a thermal barrier intended to limit heat loss between the inside and the outside of the air handling unit 1. For example, layer 25 comprises a glass-wool material, or any other suitable material.

The peripheral frame 87 comprises four of the aforementioned structural beams 2 and 3, the beams 2 being arranged longitudinally, and the beams 3 transversally, in a rectangular shape surrounding the layer 25. The frame 87 further includes four corners 99 for assembly of the beams 2 and 3 together. The four beams 2 and 3 and the corners 99 are configured to resist to the loads to which the air handling unit 1 is subjected and belong to the structural frame of the air handling unit 1. The four beams 2 and 3 preferably have an identical transversal section. The beams 2 and 3 may have different lengths, depending on the panel 4A to 4F for which they are provided.

The frame 87 is interposed between the walls 21 and 23 along the principal axis X4. The frame 87 allows mounting of the considered panel 4A to 4F onto another panel of the same type for building the air handling unit 1. The frame 87 is also configured to reduce heat transfer between the inside and the outside of the air handling unit 1. For this purpose, the beams 2 and 3 are made of a thermo-insulating material such as a plastic material.

Each beam 2 and 3 comprises three retaining holes 101. Each through hole 95 is placed in alignment with one of the retaining holes 101 parallel to the main axis X4, as visible on FIG. 3. Thus, each of the fastening systems 89 may be introduced into a pair of aligned through hole 95 and retaining hole 101. As depicted on FIG. 3, more precisely, each beam 2 and 3 is preferably an extruded part, with an elongated section including an outer portion 103, an inner portion 105, and an intermediate portion 107. The portions 103, 105 and 107 are arranged parallel to each other and to the walls 21 and 23. The outer wall 21 is supported by the outer portion 103, with the edge flange 91 resting against an edge portion 109 of the beam 2 or 3. The edge portion 109 links the outer portion 103 to the intermediate portion 107. The inner wall 23 is supported by the inner portion 105, with the edge flange 93 resting against a staggered edge portion 111 of the beam 2 or 3, linking the inner portion 105 to the intermediate portion 107.

Figure 3:
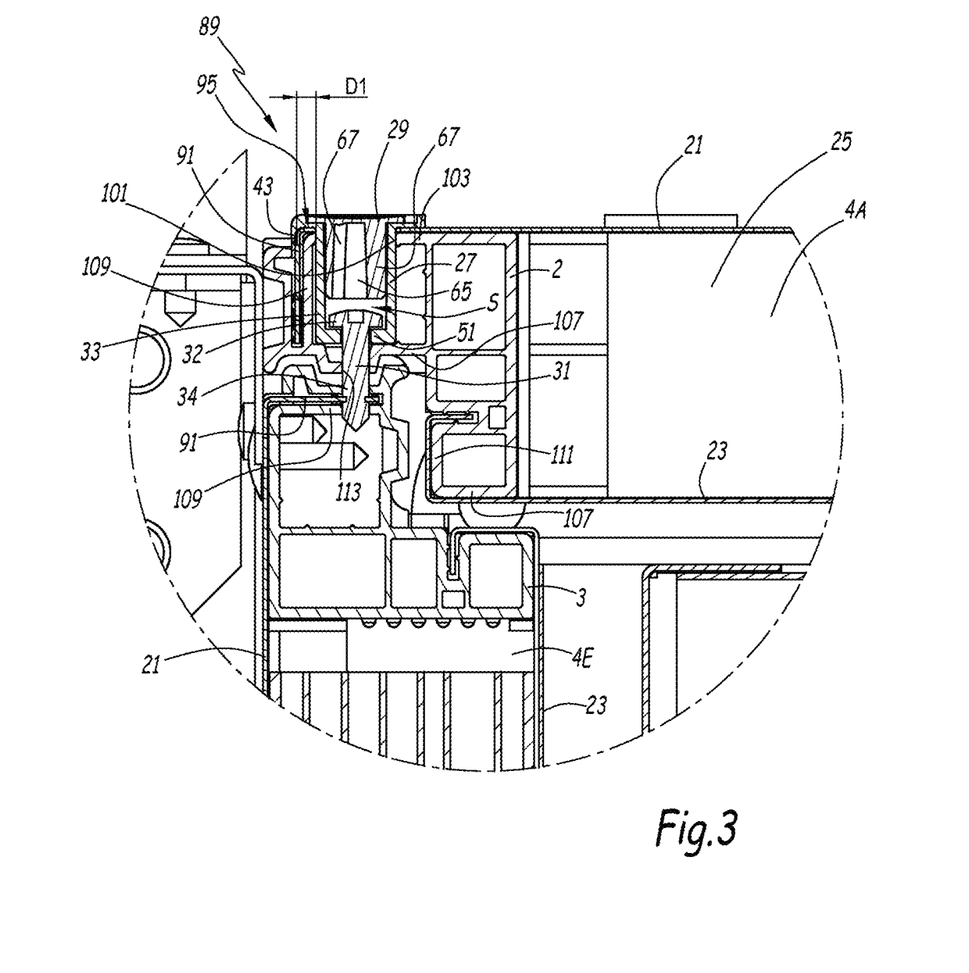
FIG. 3 is a cross-sectional view of two insulating panels of the air handling unit assembled together by means of a fastening system according to the invention.

In particular, each retaining hole 101 is provided through the outer portion 103, while intermediate holes 113 are provided through the intermediate portion 107, in alignment with the retaining holes 101, parallel to the axis X4.

Figure 4:
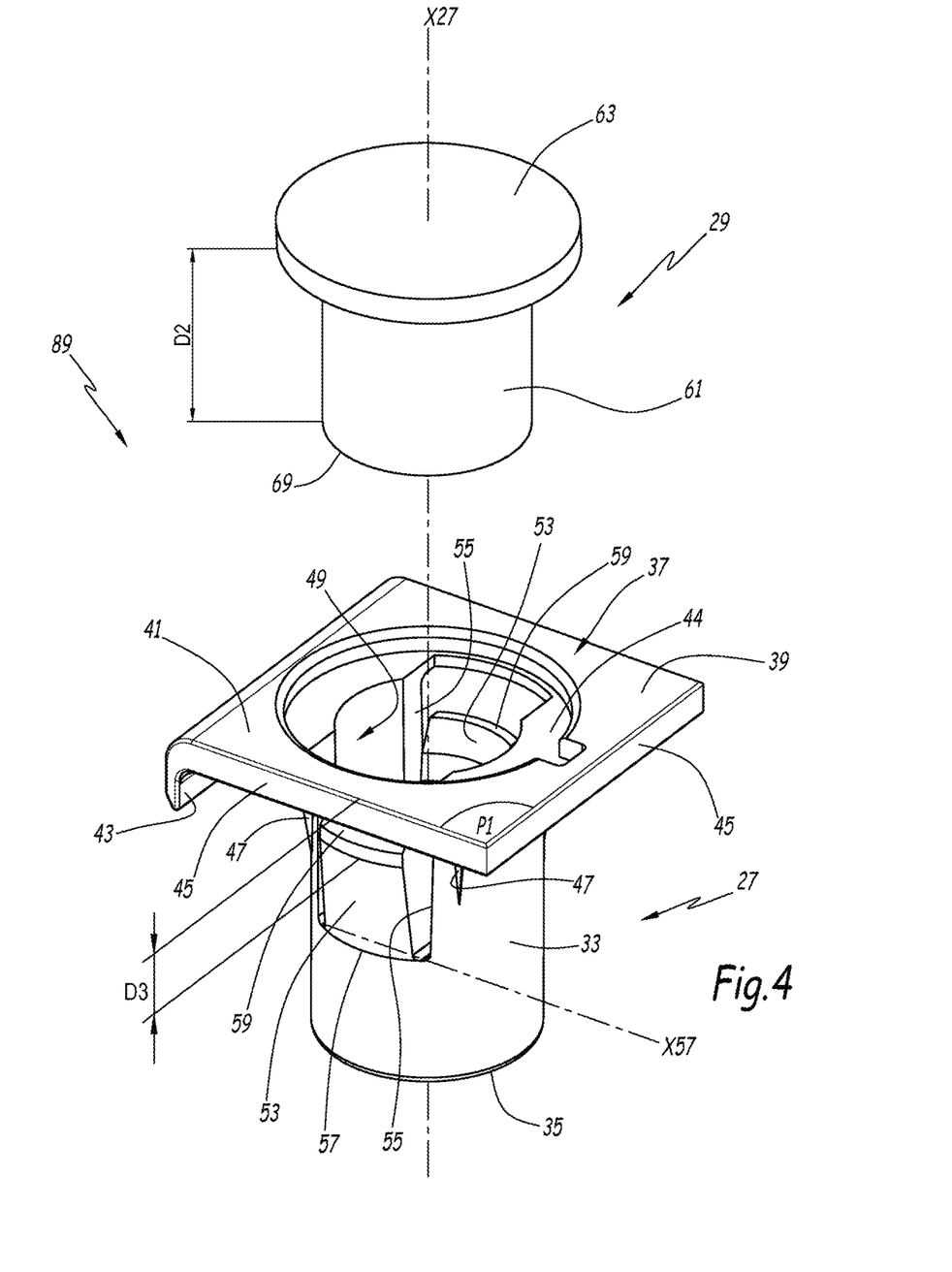
FIG. 4 is an exploded view of one of the fastening systems of FIGS. 2 and 3.

As depicted on FIGS. 3 and 4, the fastening system 89 comprises a bushing 27 and a plug 29, which constitute separate parts which may be assembled. As visible on FIG. 3, the fastening system 89 also comprises a fastener 31, comprising a head 32 and a body 34. The fastener 31 may be a self-tapping screw or any other suitable screw adapted to the application.

The bushing 27 has a main body 33, having an essentially cylindrical shape which defines a main axis X27 of said bushing 27. The main body 33 defines a distal axial end 35 and a proximal axial end 37 along the main axis X27.

The bushing 27 further comprises an external collar 39, provided at the proximal axial end 37 of the main body 33. The external collar 39 comprises a substantially square main portion 41, or at least rectangular, extending along a proximal plane P1 which is orthogonal to the main axis X27. The main portion 41 thus defines four edges 45 surrounding the main body 33 at the proximal axial end 37. The external collar 39 also includes a turned out ridge 43 extending from one of the edges 45. The turned out ridge 43 extends in a direction parallel to the main axis X27 oriented towards the distal axial end 35. The turned out ridge 43 extends all along the edge 45 and is straight shaped. The turned out ridge 43 extends alongside the main body 33 and is distant from an external surface of said main body 33 at a radial distance D1, said distance D1 being measured radially relative to the axis X27, as depicted in FIG. 3.

A counterbore 44 is provided onto the main portion 41 of the external collar 39, said counterbore 44 being circular and centered on the axis X27 at the proximal end 37. A notch 46 is also provided onto the external collar 39, at the periphery of the counterbore 44 diametrically opposite to the ridge 43 relative to the main axis X27. The notch 46 may be used as a foolproof marking, so that a user may know on which side of the axis X27 is the ridge 43, when looking at the proximal axial end 37 of the bushing 27.

As shown in FIG. 4, the bushing 27 further comprises four reinforcing ribs 47, or a different number of ribs 47 depending on the application. The ribs 47 are protruding outwardly from the main body 33 parallel to the main axis X27, from the external collar 39 down to an intermediate location of the main body 33 along the main axis X27. The reinforcing ribs 47 are preferably equally distributed around the axis X27. The ribs 47 have a conical profile and are thicker at their proximal end than at their distal end.

A bore 49 of substantially cylindrical shape is provided along the main axis X27 through the external collar 39 and the main body 33. The bore 49 is thus opened at the proximal axial end 37 and at the distal axial end 35, where the bushing 27 comprises an internal collar 51, visible on FIG. 3, provided within the bore 49. The internal collar 51 extends in a plane perpendicular to the main axis X27. The fastener 31 may be inserted through the external collar 39 into the bore 49, so that the body 34 extends through the internal collar 51 along axis X27, while the head 32 is retained within the bore 49 by the internal collar 51.

As shown in FIG. 4, the bushing 27 has two clamping wings 53, provided within diametrically opposed lateral apertures 55 of the main body 33, relative to the main axis X27. The lateral apertures 55 are located along a diameter parallel to the turned out ridge 43, relative to axis X27. Each aperture 55 is of substantially rectangular shape and extends from the external collar 39 to an intermediate location of the main body 33, along the main axis X27, further than the ribs 47. Each aperture 55 is provided through the main body 33 so as to end up inside the bore 49. Thus, the wings 53 extend approximately parallel to the axis X27 at least partially within the apertures 55.

Each of the clamping wings 53 is connected to the main body 33 at a distal edge 57 of the concerned aperture 55. The clamping wings 53 are integral with the main body 33. The distal edge 57 is opposed to the external collar 39. In other words, the distal edge 57 is oriented in a plane perpendicular to the main axis X27, said plane being located at an intermediate distance between the ends 35 and 37.

Each clamping wing 53 is elastically orientable relative to the main body 33, around a deformation axis X57 perpendicular to a radius of the main axis X27. In other words, each clamping wing 53 may be elastically bent relative to the main body 33, around the distal edge 57 of the respective aperture 55. Each wing 53 can be oriented between an outward orientation, not illustrated, an intermediate orientation, illustrated in FIG. 4, and an inward orientation, not illustrated, relative to the main body 33. The intermediate orientation is angularly defined between the outward and the inward orientations. Thus, a free edge 59 of each wing 53, opposed to the distal edge 57, can be moved substantially radially relative to the axis X27 between the outward orientation and the inward orientation. In the outward orientation, a portion of each wing 53 protrudes radially outside of the main body 33 and another portion of each wing 53 is contained within the respective aperture 55, so that said wing 53 does not protrude in the bore 49. In the inward orientation, a portion of each wing 53 is contained within the respective aperture 55 and the other portion of each wing 53 protrudes radially within the bore 49, so that the said wing 53 does not protrude outside of the main body 33. In the intermediate orientation, a portion of each wing 53 protrudes in the bore and another portion of each wing 53 protrudes outside of the main body 33.

The wings 53 are configured to elastically pull back to the intermediate orientation when put either in the outward orientation or the inward orientation. In other words, the wings 53 are configured to elastically come back from the outward orientation to the intermediate orientation, and from the inward orientation to the intermediate orientation.

The plug 29 comprises a plug-in body 61 of cylindrical shape and a cap 63 of discoid shape located at an axial end of the plug-in body 61. The cap 63 is centered on the axis of the cylindrical shape of the plug-in body 61, and is of greater diameter.

The plug-in body 61 is preferably hollow and provided with a cavity 65 opened at a distal end 69 thereof, opposite to the cap 63, as shown in FIG. 3. The cavity 65 is provided with three reinforcing axial internal ribs 67, distributed around the axis of the cylindrical shape of the body 61.

The plug-in body 61 is shaped to be entirely inserted into the bore 49 along axis X27, as depicted in FIG. 3. The cap 63 and the counterbore 44 have a corresponding shape so that said cap 63 is totally, or at least partially, inserted in said counterbore 44 when the plug-in body 61 is inserted in the bore 49. Thus, the plug 29 may be inserted into the bushing 27, through the external collar 39, or basically through the proximal axial end 37.

When the plug 29 is inserted in the bore 49, the clamping wings 53 are forced in the outward orientation, since the cylindrical shape of the plug-in body 61 has a sufficient diameter to push apart from each other the free edges 59 of said wings 53. More precisely, the plug 29 is shaped to force the clamping wings 53 from the intermediate orientation into the outward orientation when said plug 29 is inserted into the bore 49.

For this purpose also, the plug-in body 61 has a length D2 exceeding an axial distance D3 between the external collar 39 and the free edges 59 of the clamping wings 53, as depicted on FIG. 4. The length D2 is measured between the cap 63 and the distal end 69, while the axial distance D3 is measured parallel to the main axis X27. In the depicted example, the length D3 is sufficient so that the plug-in body 61 reaches the distal edges 57 of the wings 53 when the plug 29 is inserted into the bore 49. Nevertheless, the length D2 is sufficiently short so that a space S is provided between the plug-in body 61 and the internal collar 51 when the plug 29 is inserted into the bore 49, as visible on FIG. 3. When the plug 29 is inserted in the bore 49, the internal collar 51 is at a distance from the plug 29 sufficient for the head 32 of the fastener 31 to be contained inside the space S Preferably, the bushing 27 and the plug 29 are made of a plastic material, or any other suitable material which may contribute to the thermal barrier feature of the concerned panel 4A to 4F. Thus, the bushing 27 can be obtained as an integral part by injection-molding and is easy to manufacture. The plug 29 can be obtained with a similar process.

As depicted in FIG. 3 as an example applied to a panel 4A of the air handling unit 1, the main body 33 of the bushing 27 is configured to be inserted into one of the retaining holes 101, through the through hole 95 aligned with said retaining hole 101. The bushing 27 is to be inserted devoid of plug 29, for temporary enabling the wings 53 to be oriented to their inward orientation by the holes 95 and 101 and pass through the outer wall 21 and the outer portion 103 of the beam 2. Once the bushing 27 is inserted sufficiently far into the hole 101, preferably corresponding to when the external collar 51 is in contact with the wall 21, the wings 53 elastically pull back to their intermediate orientation. Thus, the wall 21 and the beam 2 depicted in FIG. 3 are assembled together between the wings 53 and the collar 39, while the bushing 27 is axially retained within the holes 95 and 101. The reinforcing ribs 47 being of conical shape, the bushing is wedged into the hole 101. The same scheme may apply to the beam 3 defined hereabove.

The holes 95 and 101 are located at a predetermined distance from edge flange 91 of the wall 21. The predetermined distance is equal to the radial distance D1, so that the turned out ridge 43 may overlay said edge flange 91 as depicted on FIG. 3 when the bushing is retained within the holes 95 and 101. Thus, the turned out ridge 43 mechanically locks the bushing 27 in rotation relative to the wall 21, around the main axis X27.

When the bushing 27 is inserted into the holes 95 and 101, the fastener 31 may be inserted into said bushing 27, through the internal collar 51 and through the intermediate hole 113, for fastening another panel 4E to the considered panel 4A of FIG. 3. Preferably, the fastener 31 is screwed to the edge flange 91 of the panel 4E and/or to the edge portion 109 of the beam 3 of said panel 4E.

Then, the plug 29 is inserted into the bore 49, so that the clamping wings 53 are put in the outward orientation by said plug 29, which strengthens the retaining action of the bushing 27 within the retaining hole 101, while the plug 29 is retained within the bore 49 by elasticity of the wings 53, between which said plug 29 is pressed radially.

In the above describes example, the bushing 27 is provided with two clamping wings 53. However, the bushing 27 may have a number of clamping wings different than two, at least one.

Fastening system 89 may be used without fastener 31, for example for securing the outer wall 21 onto the beam 2 of the panel 4A, without securing another panel 4E to said panel 4A.

The aforementioned embodiments and features of the invention may be combined for generating further embodiments of the invention.

The invention claimed is:

1. A fastening system, comprising:
a bushing, comprising:
    a main body, having an essentially cylindrical shape which defines a main axis of said bushing,
    an external collar, provided at a proximal axial end of the main body,
    a bore, provided through the external collar and the main body, along the main axis, and
    at least one clamping wing, which is provided within a lateral aperture of the main body and is elastically orientable between an outward orientation and an inward orientation relative to the main body,
a plug, which is shaped to be inserted, at least partially, into the bore along the main axis through the external collar,
wherein the plug is shaped to force the clamping wing into the outward orientation when said plug is inserted in the bore;
wherein the plug comprises a cap and wherein a counterbore is provided onto the proximal axial end, the cap and the counterbore having a corresponding shape so that said cap is at least partially inserted in said counterbore when the plug is inserted in the bore.

2. A fastening system, comprising:
a bushing, comprising:
    a main body, having an essentially cylindrical shape which defines a main axis of said bushing,
    an external collar, provided at a proximal axial end of the main body,
    a bore, provided through the external collar and the main body, along the main axis, and
    at least one clamping wing, which is provided within a lateral aperture of the main body and is elastically orientable between an outward orientation and an inward orientation relative to the main body,
a plug, which is shaped to be inserted, at least partially, into the bore along the main axis through the external collar,
wherein the plug is shaped to force the clamping wing into the outward orientation when said plug is inserted in the bore;
wherein the clamping wing is configured to elastically pull back from the outward orientation to an intermediate orientation, the intermediate orientation being defined between the outward orientation and the inward orientation, the plug being shaped to force the clamping wing from the intermediate orientation into the outward orientation when said plug is inserted into the bore.

3. The fastening system according to claim 1, wherein the plug comprises a plug-in body of substantially cylindrical shape, having a length exceeding an axial distance, measured parallel to the main axis, between the clamping wing and the external collar.

4. The fastening system according to claim 1, wherein the clamping wing is connected to the main body at a distal edge of the lateral aperture opposed to the external collar and wherein the clamping wing is elastically orientable around a deformation axis perpendicular to a radius of the main axis.

5. The fastening system according to claim 1, wherein the clamping wing is integral with the main body.

6. The fastening system according to claim 1, wherein two clamping wings are provided within diametrically opposed lateral apertures of the main body relative to the main axis.

7. The fastening system according to claim 1, wherein the external collar comprises a substantially rectangular main portion extending along a proximal plane which is orthogonal to the main axis.

8. The fastening system according to claim 1, wherein the bushing comprises a turned out ridge extending from an edge of the external collar in a direction parallel to the main axis alongside the main body and at a radial distance from said main body relative to the main axis.

9. The fastening system according to claim 1, wherein the bushing comprises foolproof marking provided on the external collar.

10. The fastening system according to claim 1, wherein the bushing comprises at least one reinforcing rib protruding outwardly from the main body parallel to the main axis.

11. The fastening system according to claim 1, wherein the bushing comprises an internal collar, provided within the bore, at a distal axial end of the main body opposed to the proximal axial end, at a distance from the plug when said plug is inserted in the bore.

12. The fastening system according to claim 1, wherein the bushing and the plug are made of a plastic material.

13. An air handling unit comprising at least one insulating panel and at least one fastening system including:
   a bushing, comprising:
      a main body, having an essentially cylindrical shape which defines a main axis of said bushing,
      an external collar, provided at a proximal axial end of the main body,
      a bore, provided through the external collar and the main body, along the main axis, and
      at least one clamping wing, which is provided within a lateral aperture of the main body and is elastically orientable between an outward orientation and an inward orientation relative to the main body,
   a plug, which is shaped to be inserted, at least partially, into the bore along the main axis through the external collar,
   wherein the plug is shaped to force the clamping wing into the outward orientation when said plug is inserted in the bore.

14. The air handling unit according to claim 13, wherein the insulating panel comprises at least one structural beam provided with at least one retaining hole and at least one wall provided with at least one through hole, the main body of the bushing being inserted within the retaining hole through the through hole, the clamping wing being put in the outward orientation by the plug.

* * * * *